(12) United States Patent
Lier (10) Patent No.: US 9,128,303 B1
(45) Date of Patent: Sep. 8, 2015

(54) CONTACT PAD ARRANGEMENT FOR EYEGLASS FRAMES

(71) Applicant: Erik Lier, Newtown, PA (US)

(72) Inventor: Erik Lier, Newtown, PA (US)

( * ) Notice: Subject to any disclaimer, the term of this patent is extended or adjusted under 35 U.S.C. 154(b) by 53 days.

(21) Appl. No.: 14/016,293

(22) Filed: Sep. 3, 2013

(51) Int. Cl.
*G02C 5/12* (2006.01)
*G02C 3/00* (2006.01)

(52) U.S. Cl.
CPC ............... *G02C 5/126* (2013.01); *G02C 3/006* (2013.01)

(58) Field of Classification Search
CPC .......... G02C 3/006; G02C 5/12; G02C 5/122; G02C 5/124; G02C 5/126; G02C 2200/04; G02C 2200/06
USPC ........................................... 351/13–139, 157
See application file for complete search history.

(56) References Cited

U.S. PATENT DOCUMENTS 2,704,961 A    3/1955  Weil
3,419,909 A *  1/1969  Spain ................................ 2/174
5,583,586 A * 12/1996  Evans ............................ 351/130
6,481,845 B1 * 11/2002  Gazzara ........................... 351/62
6,764,177 B1   7/2004  Chisolm
8,092,009 B2 *  1/2012  Williams ....................... 351/156

* cited by examiner

*Primary Examiner* — Huy K Mai
(74) *Attorney, Agent, or Firm* — LaMorte & Associates, P.C.

(57) ABSTRACT

An eyeglass assembly that enables eyeglasses to be worn more comfortably when lifted above the eyes and onto the head. The eyeglasses have a frame with a bridge. Two pad arms may extend from the frame under the bridge. Two nose pads are provided at attach to the frames either directly or with the pad arms. Each of the nose pads contains a nose contact surface. Two complex pad structures are provided that either replace or attach to the nose pads. Each of the complex pad structures has a first contact surface and a second contact surface. The first contact surface lays parallel over the nose contact surface of the nose pad. The second contact surface is oriented to be generally perpendicular to the first contact surface. When the set of eyeglasses are lifted above the eyes, the second contact surface can directly rest against the wearer's head without causing discomfort.

16 Claims, 10 Drawing Sheets

CONTACT PAD ARRANGEMENT FOR EYEGLASS FRAMES

BACKGROUND OF THE INVENTION

1. Field of the Invention

In general, the present invention relates to the structure of eyeglass frames and the structure of nose pads for eyeglass frames. The present invention also relates to items that act in conjunction with nose pads to secure eyeglass frames to a wearer's head.

2. Prior Art Description

Eyeglasses have been in existence for hundreds of years. Traditionally, eyeglasses include a frame that supports two lenses. The eyeglass frame is held on a person's head using temple elements and nose pads. The temple elements pass along the side of the head and hook around the tops of the wearer's ears. This prevents the eyeglass frames from falling forward. The nose pads support the frames on the nose so that the frames are properly positioned in front of the wearer's eyes. The nose pads also cushion the contact between the eyeglass frames and the bridge of the wearer's nose so that the eyeglass frames do not cause discomfort. The nose pads work in conjunction with the temple elements to help prevent the eyeglass frames from moving side-to-side or sliding down the wearer's nose.

Since the primary purpose of nose pads on eyeglass frames is to contact the nose, nose pads typically have large contact surfaces that are angled to match the angle of the wearer's nose. The nose pads, therefore, disperse the weight of the eyeglasses on the bridge of the nose and make the eyeglasses more comfortable to wear. The nose pads are commonly mounted to wire pad arms that enable the angle of the nose pads to be altered slightly to match the anatomical features of different noses. Other types of nose pads are formed directly onto the frame of the eyeglasses and do not utilize wire pad arms. Regardless, the purpose of the nose pad is to increase the area upon which the eyeglasses rest upon the nose, thereby making the eyeglasses more comfortable to wear.

As many wearers of eyeglasses will profess, eyeglasses are often flipped up onto the top of the head while still being worn. This manipulation temporarily moves the eyeglasses away from the user's eyes. This manipulation is commonly performed with sunglasses when a person walks indoors, or with eyeglasses for farsightedness when a person wants to read. When eyeglasses are turned up onto the head, the notepads serve no useful purpose. The temple elements of the eyeglasses may still engage the ears, but more often they are separated from the ears so that much or all of the friction about the ear is lost. Rather, the eyeglasses are primarily held on the head by friction with the wearer's hair and/or by being balanced about the crown of the wearer's head. Such positioning is highly precarious. Consequently, the eyeglasses commonly fall forward onto the nose of the wearer or off the head whenever the wearer tilts his/her head forward. The tendency of the eyeglass to slip from the head increases as the contact point along the eyeglasses come into contact with sweat of the skin and the natural oils that coat the skin and hair.

In the prior art, there are many eyeglass frame designs that are designed to enable eyeglass lenses to "flip up" out of a person's line of light. However, such systems typically use hinges either in the temple elements of the eyeglasses or at the lens mounts. A problem associated with such hinge-based prior art eyeglass frames is that specialized frames must be used. The hinge elements cannot be added to existing sets of eyeglasses without replacing major structural elements of the eyeglasses.

In the prior art, it will be understood that the ability to keep a set of eyeglasses propped up on a person's head can be enhanced by the use of a tether that pulls the eyeglass frames against the head. The more a set of eyeglasses are pulled against a person's head, the more friction exists and the less likely it will be that the eyeglasses will slip. Tethers designed to retain eyeglasses are exemplified by U.S. Pat. No. 6,764,177 to Chisolm, entitled Eyeglass Retainer, and U.S. Pat. No. 2,704,961 to Weil, entitled Means For Supporting Spectacles.

A problem associated with the use of tethers is that tethers pull the structure of a set of eyeglasses against the head. The eyeglasses contact the head at hard points along the eyeglass frames. This can cause discomfort to a person wearing the eyeglasses in a raised position.

A need therefore exists in the art for a system that enables a set of eyeglasses to be flipped up above the eyes in a manner that is highly stable, yet requires no specialized frames or significant modifications to existing frames. A need also exists for a system that can be provided with a tether, wherein the tether does not bias the eyeglasses against a user's head in an uncomfortable manner. These needs are met by the present invention as described and claimed below.

SUMMARY OF THE INVENTION

The present invention is an eyeglass assembly that enables eyeglasses to be worn more comfortably when lifted above the eyes and onto the forehead or head. The eyeglasses have a frame with a nose bridge. Temple elements are attached to the frame. Two pad arms may extend from the frame under the nose bridge. Two nose pads are supported by the pad arms, if the pad arms are used. Otherwise, the nose pads can be formed directly as part of the frame. Each of the nose pads contains a nose contact surface.

Two complex pad structures are provided that either replace or attach to the nose pads. Each of the complex pad structures has a first contact surface and a second contact surface. The first contact surface lays parallel over the nose contact surface of the nose pad. The second contact surface is oriented to be generally perpendicular to the first contact surface. As a result, when the set of eyeglasses are lifted above the eyes, the second contact surface can directly rest against the wearer's head without causing discomfort.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention eyeglass assembly can be embodied in many ways, only three embodiments of the invention are shown. These embodiments are selected as examples of the best modes for the invention. The illustrated embodiments, however, are merely exemplary and should not be considered a limitation when interpreting the scope of the appended claims.

Figure 1:
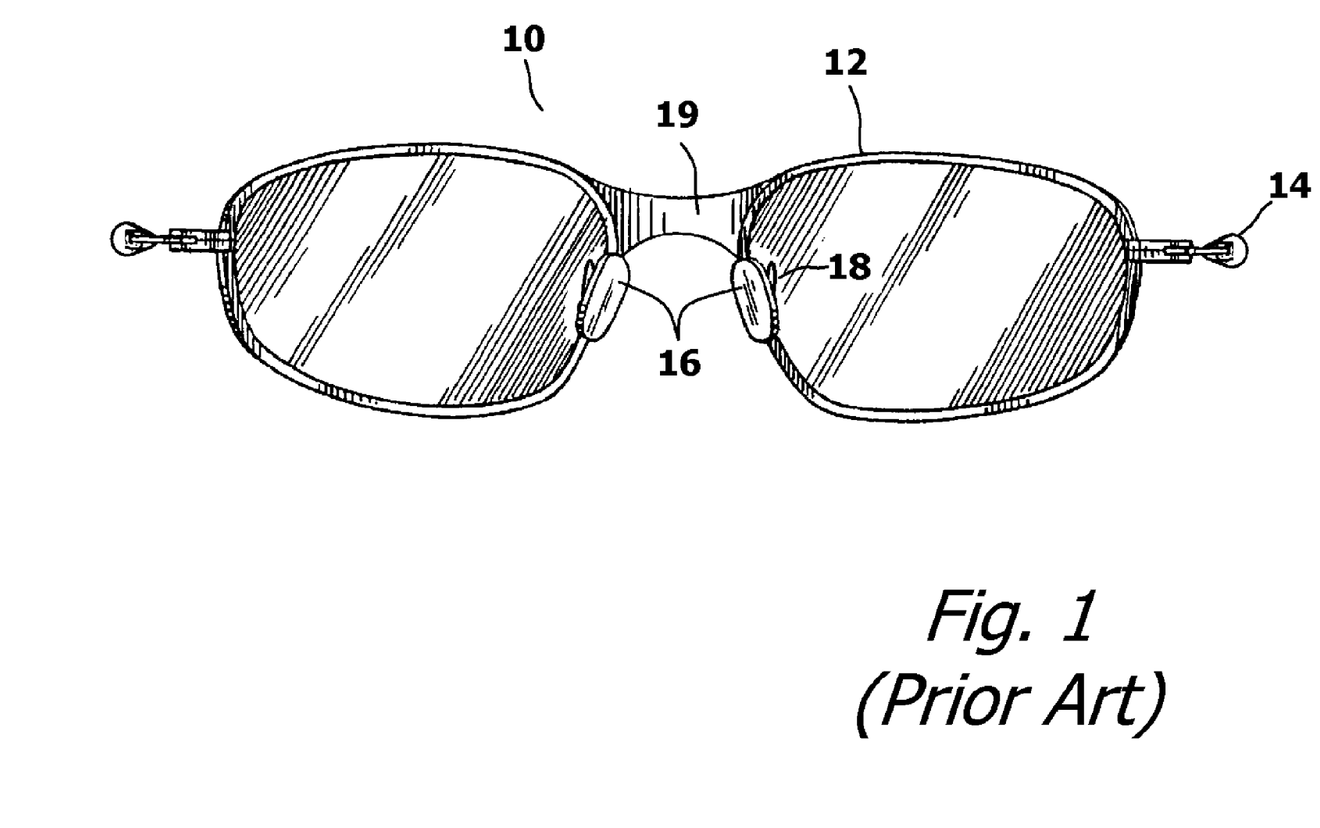
FIG. 1 is front view of a traditional prior art set of eyeglasses.
Figure 2:
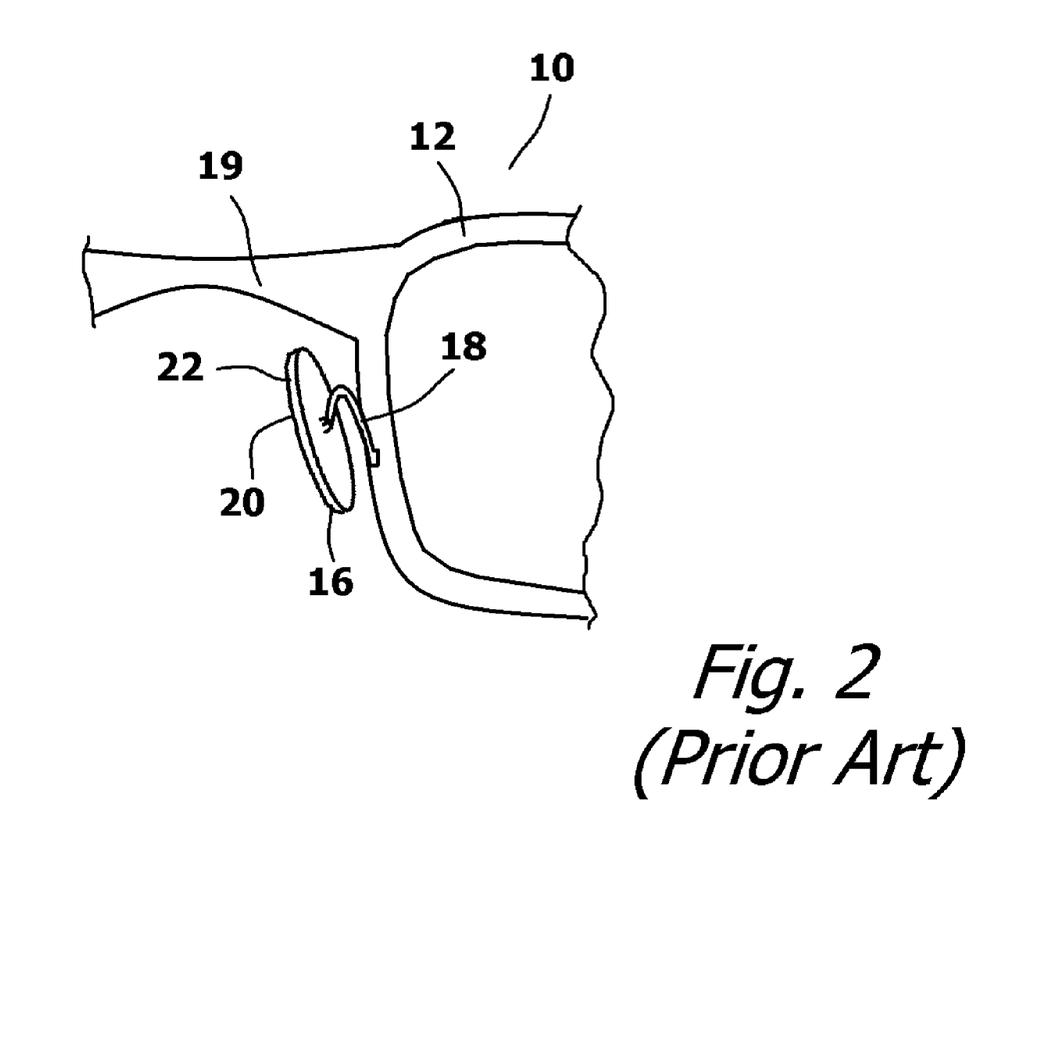
FIG. 2 is an enlarged view of a nose pad on the prior art eyeglasses of FIG. 1.

Referring to FIG. 1 in conjunction with FIG. 2, a prior art set of eyeglasses 10 is shown. The set of eyeglasses 10 includes frames 12, temple elements 14 and nose pads 16. The frames 12 include a bridge 19. The bridge 19 of the frames 12 extend in a plane that is generally parallel to the primary place of the face of the person wearing the set of eyeglasses 10. The nose pads 16 can be affixed directly to the frames 12. However, in the shown example, and in most instances, the nose pads 16 are supported by pad arms 18 that interconnect the nose pads 16 to the frame 12. The pad arms 18 are positioned under the bridge 19 of the frames 12 and provide flexibility to the nose pads 16. Furthermore, the pad arms 18 can be manually deformed to change the orientation of the nose pads 16 so that they match the contours of a particular person's nose.

The nose pads 16 are typically made of plastic and have contact surfaces 20 oriented to rest upon the sides of the bridge of the nose when the set of eyeglasses 10 is worn. As such, the large contact surfaces 20 of the nose pads 16 are oriented in planes that are nearly perpendicular to the primary plane of the face. The contact surface 20 of the nose pad 16 is typically between 0.5 square centimeters and one square centimeter. The contact surface 20 of the nose pad 16 is surrounded by a peripheral edge 22 that is narrow by comparison. As a result, if the set of eyeglasses 10 were rotated up onto the forehead of a person, only the peripheral edges 22 of the nose pads 16 would touch the forehead of the wearer. Since the peripheral edges 22 of the nose pads 16 are hard and narrow, they quickly become uncomfortable if they press against the skin of the forehead.

Figure 3:
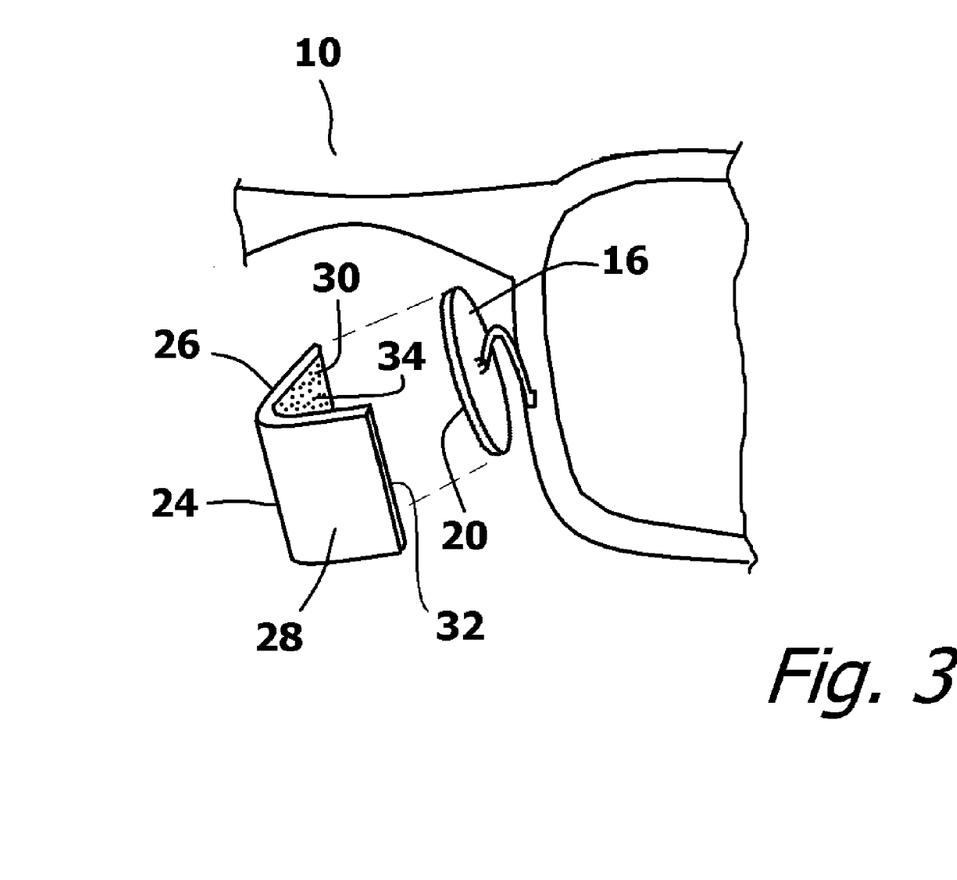
FIG. 3 is a perspective view of an exemplary embodiment of a complex auxiliary pad shown in conjunction with the prior art nose pad of FIG. 2.

Referring to FIG. 3, a first embodiment of a complex auxiliary pad 24 is shown. The complex auxiliary pad 24 has a generally L-shaped profile. As such, the complex auxiliary pad 24 has a first nose contact surface 26 and a second head contact surface 28, wherein the nose contact surface 26 and the head contact surface 28 are generally perpendicular to each other and can range from 90 degrees up to 120 degrees depending upon the style of the eyeglasses. The nose contact surface 26 has an area that is preferably no larger than the contact surface 20 on the nose pad 16. This enables the nose contact surface 26 to cover, or at least mostly cover the contact surface 20. Preferably, the area of the nose contact surface 26 is between 0.5 and 1.0 square centimeters. The head contact surface 28 preferably has an area comparable to that of the nose contact surface 26. However, the area of the head contact surface 28 can be smaller provided it maintains an area that is at least half that of the nose contact surface 26. This keeps the contact surface 28 narrow enough in the horizontal direction so it does not block the field of view for the wearer of the glasses. It could be made longer in the vertical direction, along the frame, to provide a larger surface and thus more comfort.

The nose contact surface 26 and the head contact surface 28 face outwardly on the complex auxiliary pad 24. The complex auxiliary pad 24 also has a first inside surface 30 and a second inside surface 32 that are generally perpendicular to each other and face inwardly.

A layer of adhesive 34 is applied to the first inside surface 30. The layer of adhesive 34 is preferably protected by a peel-away cover. The layer of adhesive 34 is used to directly attach the first inside surface 30 of the complex auxiliary pad 24 to the contact surface 20 of the nose pad 16. Once the complex auxiliary pad 24 is affixed to the nose pad 16, the nose contact surface 26 lays in front of the original contact surface 20 of the nose pad 16 in a parallel plane. Furthermore, the head contact surface 28 of the complex auxiliary pad 24 now extends in a plane that is perpendicular to both the contact surface 20 of the nose pad 16 and the overlying nose contact surface 26 of the complex auxiliary pad 24. This positions the head contact surface 28 in a plane that is generally parallel to the primary plane of the wearer's face.

With the complex auxiliary pad 24 installed, the set of eyeglasses 10 can be worn in the normal manner. However, instead of the original contact surface 20 of the nose pad 16 directly contacting the wearer's nose, the overlying nose contact surface 26 of the complex auxiliary pad 24 will contact the wearer's nose.

Figure 4:
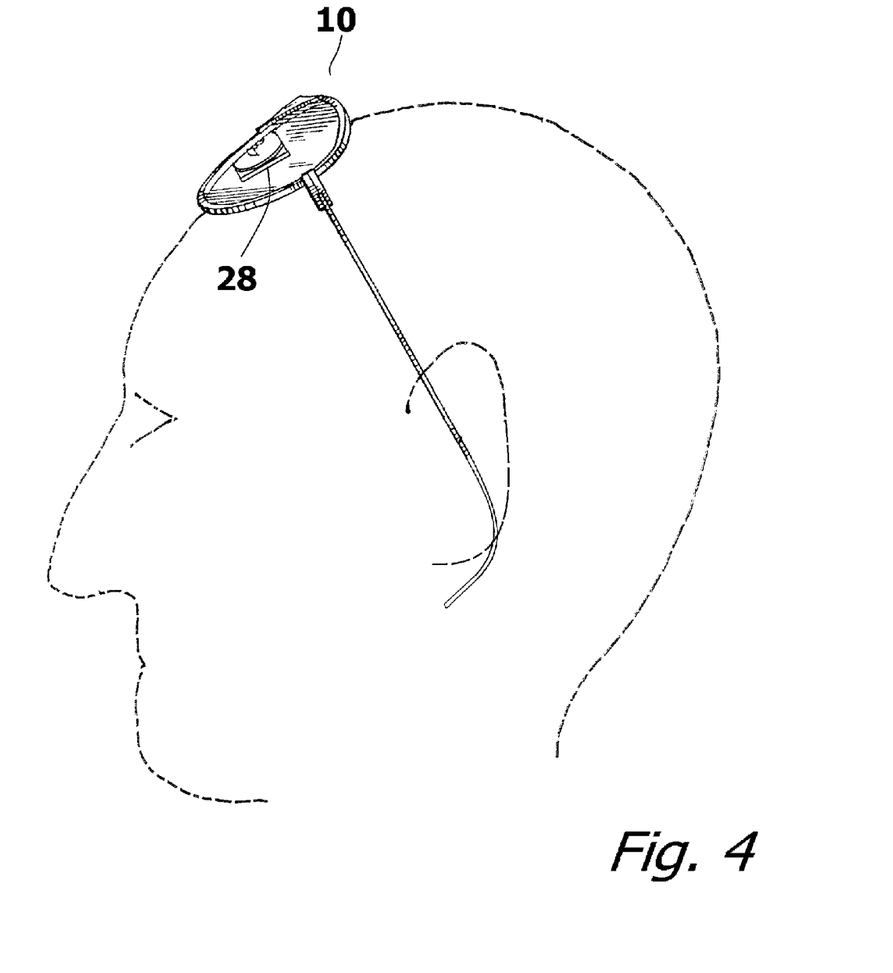
FIG. 4 is a view of a person's head wearing the assembly of components shown in FIG. 3.

Referring to FIG. 4 in conjunction with FIG. 3, it can be seen that when the set of eyeglasses 10 are rotated up onto the forehead or higher, the head contact surface 28 now abuts flush against the head of the wearer. Since the head contact surface 28 is large and smooth, the contact between the head contact surface 28 and the skin of the head is not uncomfortable, even if the set of eyeglasses 10 is biased against the head with a tether.

The abutment between the head contact surface 28 and the head prevents the set of eyeglasses 10 from slipping down the head of the wearer. As such, the presence of the head contact surface 28 not only makes the positioning of the set of eyeglasses 10 above the eyes comfortable, but it also prevents the set of eyeglasses 10 from inadvertently falling back onto the user's nose.

In the embodiment of FIG. 3 and FIG. 4, the complex auxiliary pad 24 attaches to the nose pad 16 of the set of eyeglasses 10 with a layer of adhesive 34. In an alternate embodiment, an auxiliary pad can be attached to the nose pad 16 of a set of eyeglasses using mechanical interconnections. Such an embodiment is shown in FIG. 5.

Figure 5:
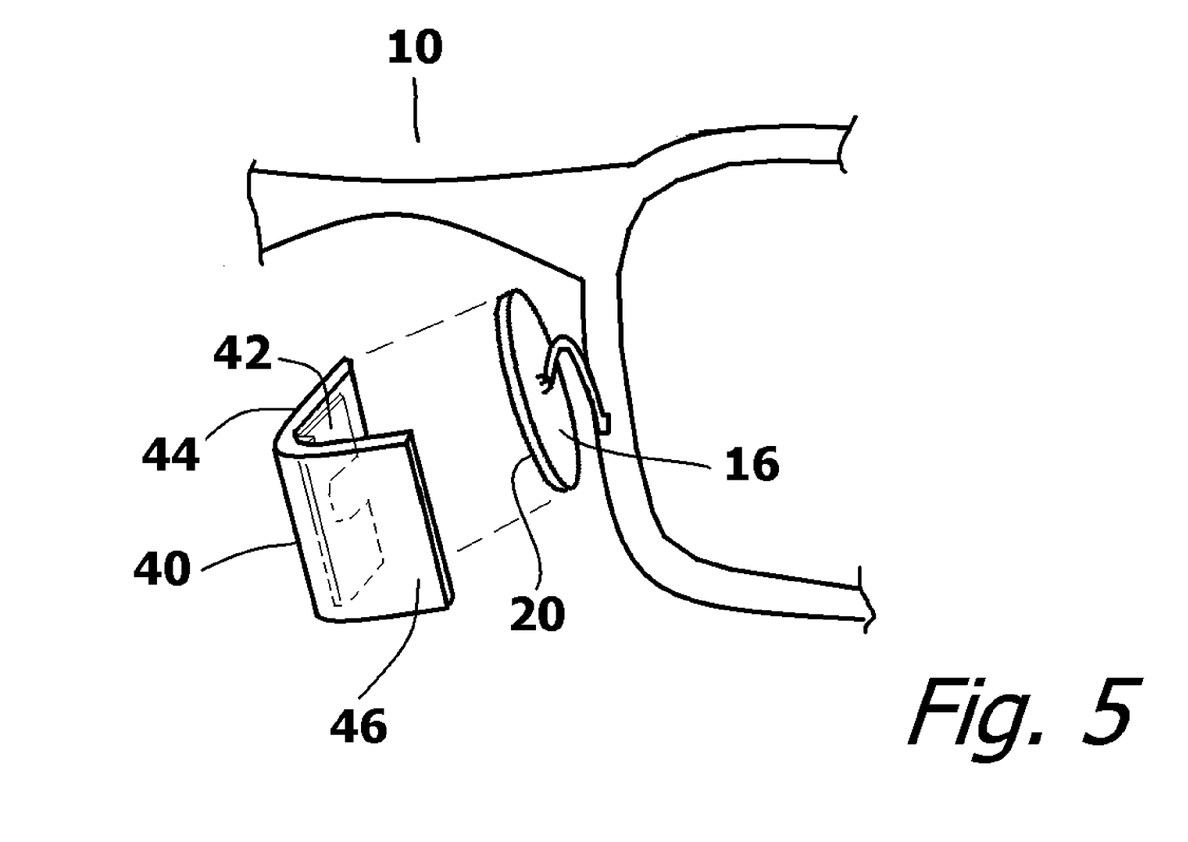
FIG. 5 is a perspective view of a second exemplary embodiment of a complex auxiliary pad shown in conjunction with the prior art nose pad of FIG. 2.

Referring to FIG. 5, it can be seen that a complex auxiliary pad 40 can be formed with a spring clip arm 42 that engages a nose pad 16. The spring clip arm 42 is biased closed so that it is spread by the nose pad 16 when pressed over a nose pad 16. In this manner, the spring clip arm 42 mechanically engages the nose pad 16.

The complex auxiliary pad 40 has a nose contact surface 44 that lays over the original contact surface 20 of the nose pad 16. The auxiliary pad 40 also has a head contact surface 46, that is perpendicular to the nose contact surface 44. The head contact surface 46 is generally parallel to the general plane of the user's face.

Figure 6:
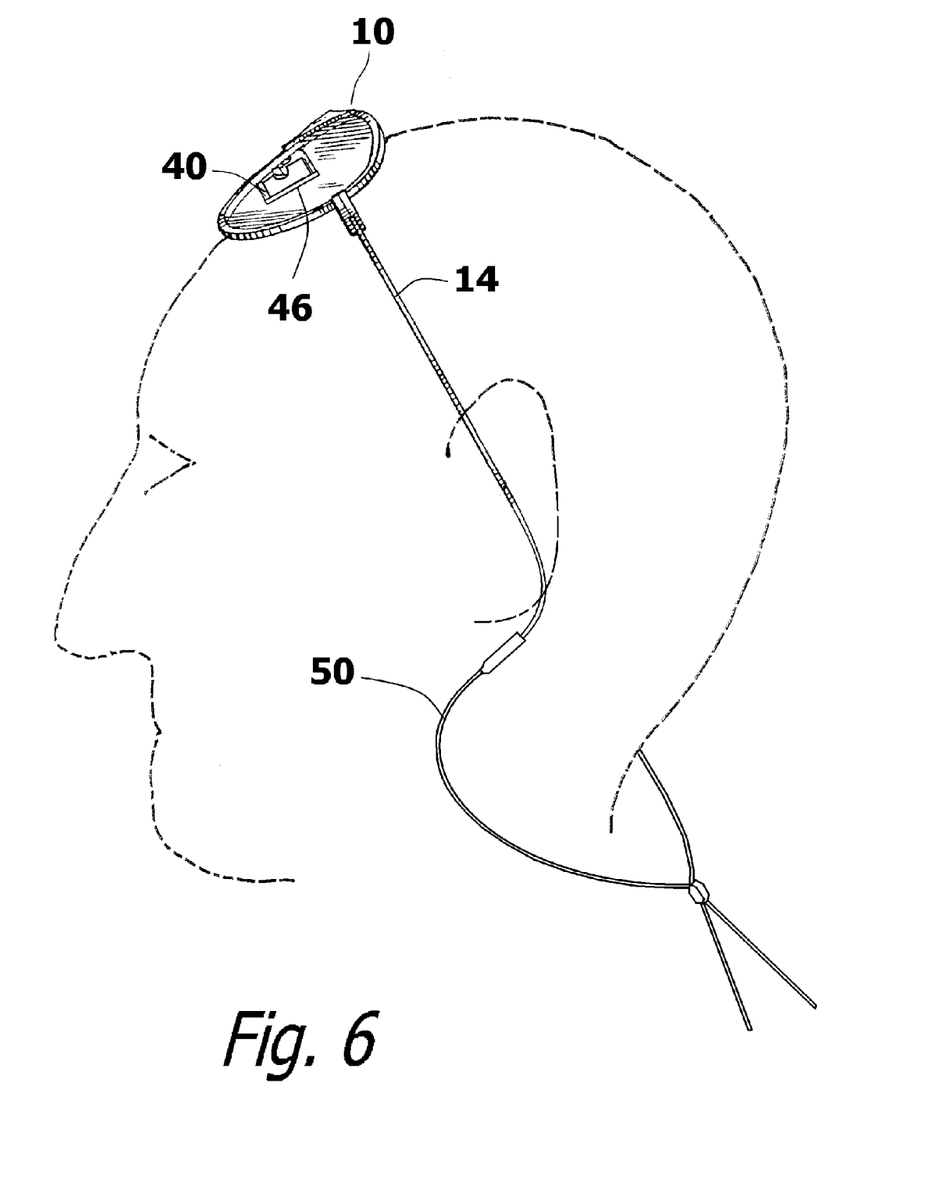
FIG. 6 is a view of a person's head wearing the assembly of components shown in FIG. 5 plus an optional elastic tether.

Referring to FIG. 6 in conjunction with FIG. 5, it can be seen that when the set of eyeglasses 10 are rotated up onto the forehead or higher, the head contact surface 46 now abuts flush against the head of the wearer. Since the head contact surface 46 is large and smooth, the contact between the head contact surface 46 and the skin of the head is not uncomfortable. In the shown embodiment, the set of eyeglasses 10 are further supplemented with an elastic tether 50 that extends behind the head of the user from one temple element 14 to the other. The tether 50 biases the set of eyeglasses 10 toward the head. As such, the head contact surface 46 of the complex auxiliary pad 40 is biased into contact with the head.

The abutment between the head contact surface 46 and the head prevents the set of eyeglasses 10 from slipping down the head of the wearer. As such, the presence of the head contact surface 46 not only makes the positioning of the set of eyeglasses 10 above the eyes comfortable, but it also prevents the set of eyeglasses 10 from inadvertently falling back onto the user's nose.

Figure 7:
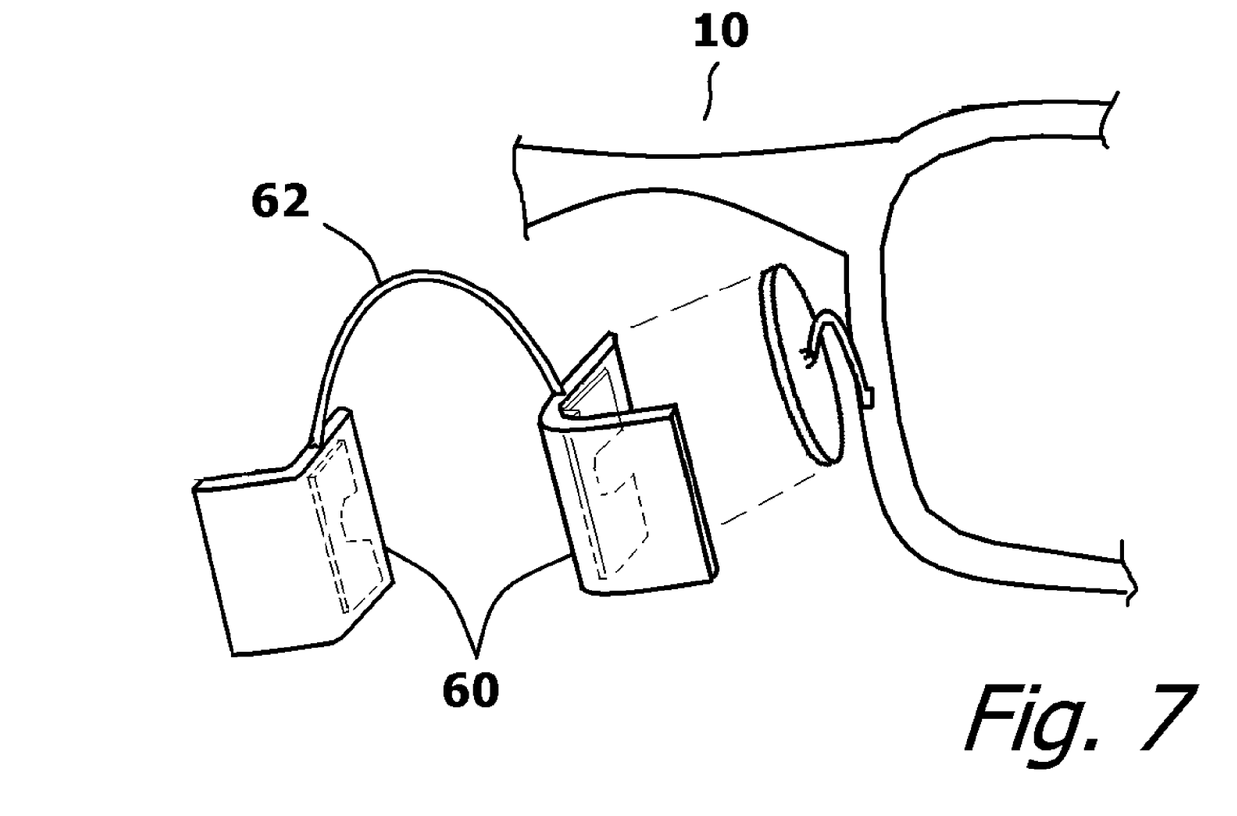
FIG. 7 is a perspective view of a third exemplary embodiment of a complex auxiliary pad shown in conjunction with the prior art nose pad of FIG. 2.

Referring now to FIG. 7, a third embodiment is shown. In this embodiment, two clip-on auxiliary pads 60 are joined together with a common spanner 62. The spanner 62 enables the two clip-on auxiliary pads 60 to be attached to, and removed from, the eyeglasses 10 as a unit.

Figure 8:
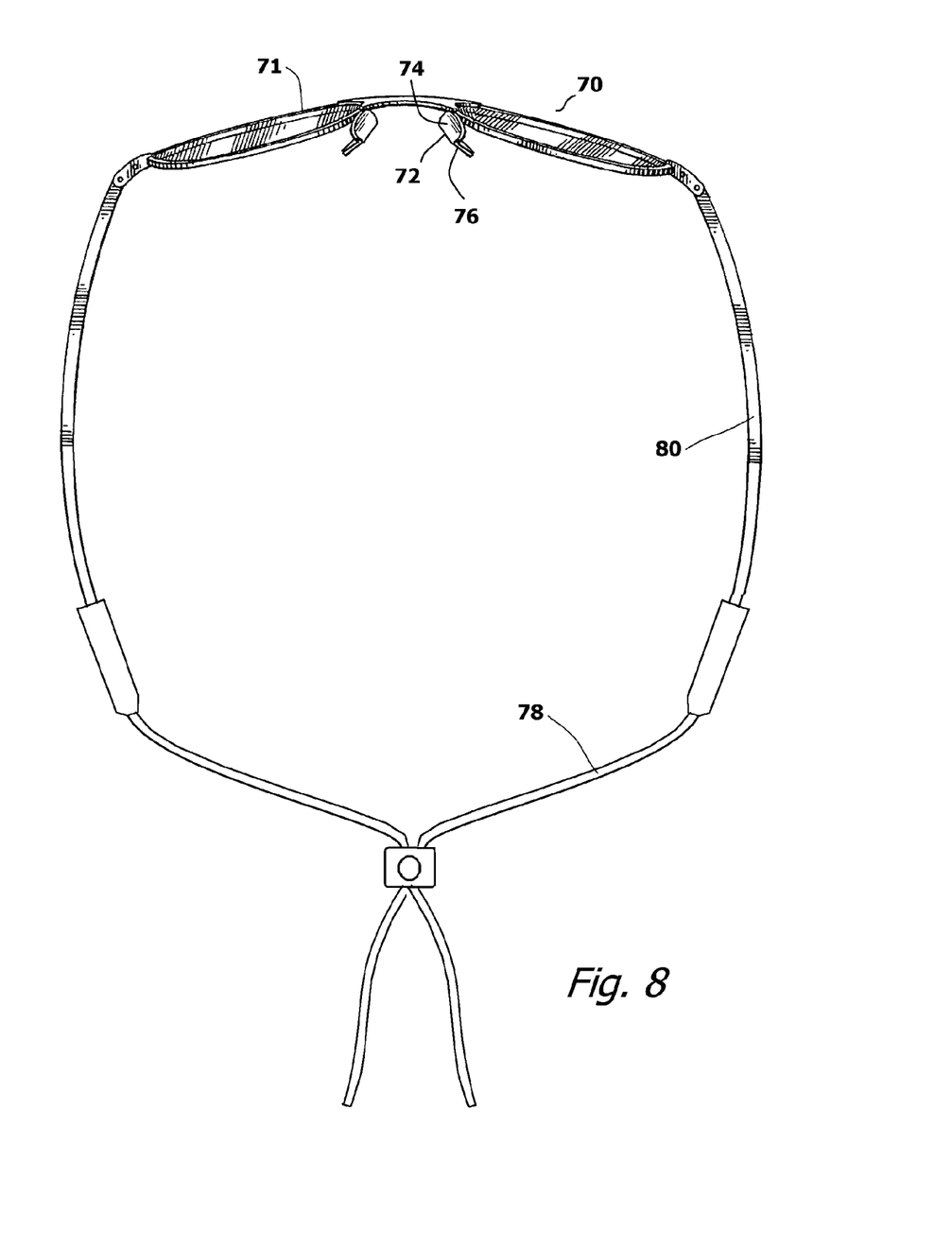
FIG. 8 is a bottom view of a set of eyeglasses in accordance with an embodiment of the present invention.

Referring to FIG. 8, a full eyeglass assembly 70 is shown that embodies the present invention. In this embodiment, specialized pads 72 are manufactured into shape of the frames 71 of the eyeglasses 70 rather than being retroactively added to the set of eyeglasses 70. As such, it will be understood that the eyeglasses 70 do not need to have pad arms to support the specialized pads 72. Rather, the specialized pads 72 are supported directly by the frames 71.

The specialized pads 72 on the set of eyeglasses 70 include a nose contact surface 74 and a head contact surface 76 that are joined together at a generally perpendicular angle of between 90 degrees and 120 degrees. The nose contact surface 74 and the head contact surface 76 illustrated are approximately the same size and have generally the same contact area. However, different sizes can be used depending upon the style of the eyeglasses 70.

The set of eyeglasses 70 is also fit with an elastic tether 78. The elastic tether 78 joins the temple elements 80 behind the head. When the tether 78 is tightened, the tether 78 biases the specialized pads 72 against the head. If the set of eyeglasses 70 is worn over the eyes, the nose contact surface 74 is biased against the nose. Conversely, if the set of eyeglasses 70 is lifted to the forehead, the tether 78 biases the head contact surface 76 against the head.

Figure 9:
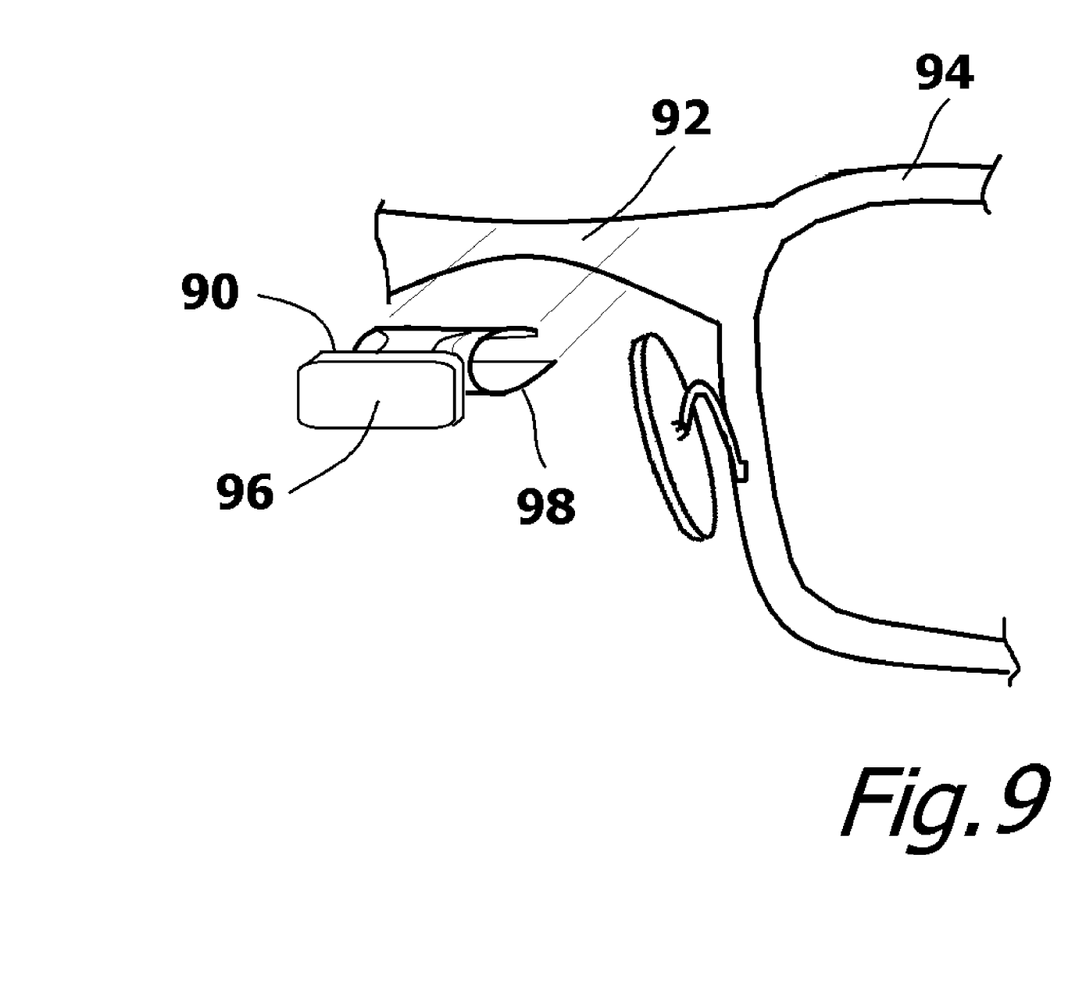
FIG. 9 is a perspective view of a fourth exemplary embodiment of a complex auxiliary pad shown in conjunction with a prior art bridge of a set of eyeglasses.
Figure 10:
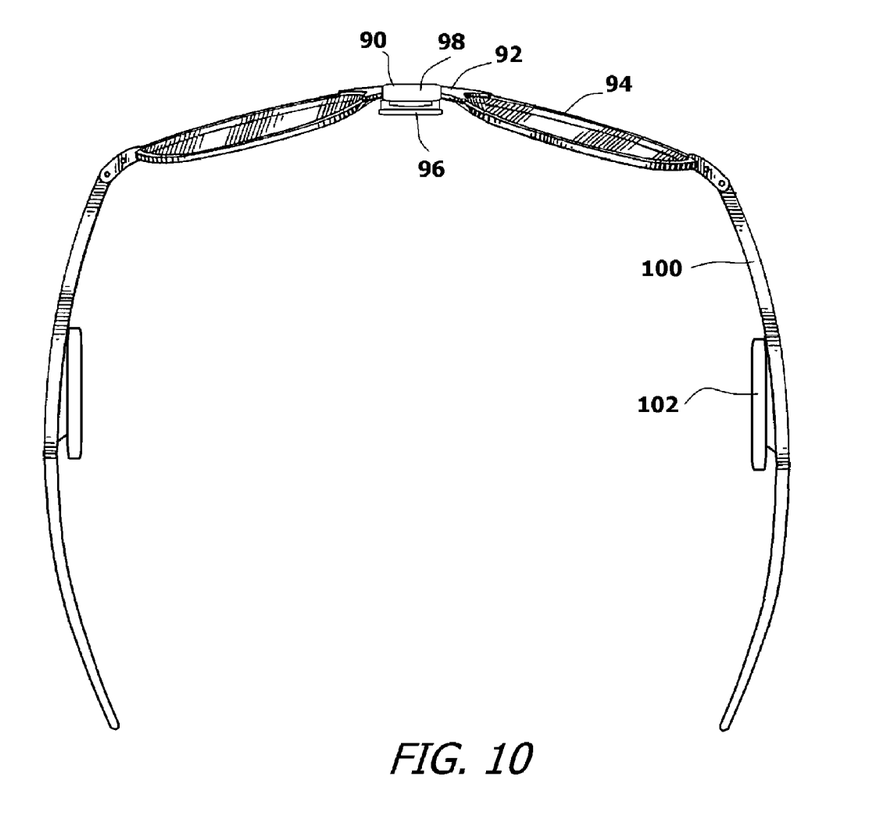
FIG. 10 is a bottom view of a set of eyeglasses in accordance with the exemplary embodiment of FIG. 9.

Lastly, referring to FIG. 9 in conjunction with FIG. 10, it will be an embodiment of the present invention is shown where a specialized pad assemblage 90 is attached to the bridge 92 of a set of eyeglasses 94. The specialized pad assemblage 90 can be manufactured as an integral part of the bridge 92. However, in the shown embodiment, the specialized pad assemblage 90 retroactively attaches to an existing set of eyeglasses 94.

The specialized pad assemblage 90 has a head contact surface 96 that contacts the wearer's head when the eyeglasses 94 are lifted up onto the forehead or head. The head contact surface 96 both increases friction with the head and increases comfort by providing a larger area of contact.

A mechanical clip 98 extends from the head contact surface 96. The mechanical clip 98 is sized and shaped to engage the bridge 92 of the eyeglasses 94.

In FIG. 10, it can be seen that the eyeglasses 94 have temple elements 100. Optional temple pads 102 can be attached to the temple elements 100 to help increase friction with the wearer's head. This helps to hold the eyeglasses 94 up when lifted onto the head.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. An eyeglass assembly, comprising:
    a frame having a nose bridge;
    temple elements attached to said frame;
    pad arms extending from said frame under said nose bridge;
    a complex pad supported by each of said pad arms, each said complex pad having a first contact surface and a second contact surface, wherein said first contact surface and said second contact surface are generally perpendicular, and wherein said second contact surface has an area no less than half that of said first contact surface.

2. The assembly according to claim 1, further including a nose pad affixed to each of said pad arms, wherein said complex pad attaches to said nose pad.

3. The assembly according to claim 2, further including a layer of adhesive on said complex pad that enables said complex pad to adhesively attach to said nose pad.

4. The assembly according to claim 2, wherein each said complex pad has a clip arm that enables said complex pad to mechanically engage said nose pad.

5. The assembly according to claim 1, further including a tether that extends between said temple elements that is used to bias said complex pad against a user's head when said assembly is worn by a user.

6. The assembly according to claim 1, further including a bridge element that interconnects each of said complex pads.

7. An auxiliary pad that connects to the nose pad of a set of eyeglasses, said auxiliary pad comprising:
    a complex pad structure having a first contact surface and a second contact surface that are generally oriented at a perpendicular angle, wherein said second contact surface has an area no less than half that of said first contact surface.

8. The pad according to claim 7, further including a layer of adhesive that enables said complex pad structure to adhesively attach to said nose pad.

9. The assembly according to claim 7, wherein each said complex pad structure has a clip arm that enables said complex pad to mechanically engage said nose pad.

10. An eyeglass assembly, comprising:
    a frame having a nose bridge, wherein said nose bridge extends in a primary plane;
    two pad arms extending from said frame under said nose bridge;
    two nose pads supported by said pad arms;
    temple elements attached to said frame;
    two separate pad structures that attach to said nose pads, each of said separate pad structures having a head contact surface of at least 0.5 square centimeters that is oriented in a plane that is generally parallel to said primary plane of said nose bridge, wherein said head contact surface is the primary point of contact between said frame and a wearer's head when said frames are rested atop a wearer's head.

11. The assembly according to claim 10, wherein said at least one pad structure extends inwardly from said nose bridge of said frames.

12. The assembly according to claim 10, wherein said at least one pad structure extends inwardly from said frames under said nose bridge.

13. The assembly according to claim 10, further including a layer of adhesive on each of said pad structures that enables said pad structures to adhesively attach to said nose pads.

14. The assembly according to claim 10, wherein each of said pad structures includes a clip arm that enables said complex pad structures to mechanically engage said nose pads.

15. The assembly according to claim 10, further including a tether that extends between said temple elements that is used to bias said pad structures against a user's head when said assembly is worn by a user.

16. The assembly according to claim 10, further including a spanner that interconnects each of said pad structures.

\* \* \* \* \*